(12) United States Patent
Breuer et al.

(10) Patent No.: US 10,966,082 B2
(45) Date of Patent: Mar. 30, 2021

(54) MOBILE COMMUNICATION DEVICE WITH SUBSCRIBER IDENTITY MODULE

(71) Applicants: Gemalto M2M GmbH, Munich (DE); GEMALTO SA, Meudon (FR)

(72) Inventors: Volker Breuer, Boetzow (DE); Lars Wehmeier, Falkensee (DE); Mireille Pauliac, Gemenos (FR)

(73) Assignees: THALES DIS AIS DEUTSCHLAND GMBH, Munich (DE); THALES DIS FRANCE SA, Meudon (FR)

( * ) Notice: Subject to any disclaimer, the term of this patent is extended or adjusted under 35 U.S.C. 154(b) by 248 days.

(21) Appl. No.: 16/097,411

(22) PCT Filed: Apr. 24, 2017

(86) PCT No.: PCT/EP2017/059600
§ 371 (c)(1),
(2) Date: Oct. 29, 2018

(87) PCT Pub. No.: WO2017/190969
PCT Pub. Date: Nov. 9, 2017

(65) Prior Publication Data
US 2019/0149985 A1 May 16, 2019

(30) Foreign Application Priority Data
May 4, 2016 (EP) .................................. 16305521

(51) Int. Cl.
*H04W 12/00* (2021.01)
*H04W 8/18* (2009.01)
(Continued)

(52) U.S. Cl.
CPC .... *H04W 12/00409* (2019.01); *H04B 1/3816* (2013.01); *H04L 63/1408* (2013.01);
(Continued)

(58) Field of Classification Search
CPC ....... H04W 12/00409; H04W 12/1206; H04W 12/06; H04W 8/183; H04W 52/0209;
(Continued)

(56) References Cited

U.S. PATENT DOCUMENTS

| 2012/0289184 A1* | 11/2012 | Wijayanathan ... H04M 3/42195 |
| | | 455/404.1 |
| 2013/0237197 A1* | 9/2013 | Ruvalcaba ............ H04W 8/183 |
| | | 455/418 |

(Continued)

OTHER PUBLICATIONS

"Universal Mobile Telecommunications System (UMTS)" LTE; Non-Access-Stratum (NAS) protocol for Evolved Packet System (EPS), vol. 3GPP CT 1, No. V13.5.0, 399 pages, Apr. 1, 2016, XP014274258.

(Continued)

*Primary Examiner* — J. Brant Murphy
(74) *Attorney, Agent, or Firm* — Buchanan Ingersoll & Rooney PC

(57) ABSTRACT

The present invention relates to a mobile communication device for communicating with a cellular network by means of a serving base node, the mobile communication device further being connected to a subscriber identity module, the mobile communication device being configured to operate in a power optimization mode wherein the power optimization mode comprises extended paging periods, and the mobile communication device is further configured to set up a communication context with the base node using authentication means of the subscriber identity module, wherein the mobile communication device is further configured, in case of detection of a removal of the subscriber identity module and when the power optimization mode is activated: to send an removal alert message to the serving base node by means of said communication context, afterwards to terminate the communication context.

11 Claims, 5 Drawing Sheets

(51) Int. Cl.
    *H04W 52/02*     (2009.01)
    *H04L 29/06*     (2006.01)
    *H04W 12/12*     (2021.01)
    *H04B 1/3816*     (2015.01)
    *H04W 12/06*     (2021.01)
    *H04W 88/02*     (2009.01)

(52) U.S. Cl.
    CPC ........... *H04W 8/183* (2013.01); *H04W 12/06* (2013.01); *H04W 12/1206* (2019.01); *H04W 52/0209* (2013.01); *H04W 88/02* (2013.01); *Y02D 30/70* (2020.08)

(58) Field of Classification Search
    CPC .. H04W 88/02; H04L 63/1408; H04B 1/3816; Y02D 30/70
    See application file for complete search history.

(56) References Cited

U.S. PATENT DOCUMENTS

2017/0250958 A1*   8/2017   Ballantyne ............ H04W 12/06
2018/0242388 A1*   8/2018   Park ...................... H04W 76/28

OTHER PUBLICATIONS

International Search Report (PCT/ISA/210) dated Jul. 18, 2017, by the European Patent Office as the International Searching Authority for International Application No. PCT/EP2017/059600.
Written Opinion (PCT/ISA/237) dated Jul. 18, 2017, by the European Patent Office as the International Searching Authority for International Application No. PCT/EP2017/059600.

* cited by examiner

MOBILE COMMUNICATION DEVICE WITH SUBSCRIBER IDENTITY MODULE

FIELD OF THE INVENTION

The present invention relates to a mobile communication device with a subscriber identity module.

The invention also pertains to method for operating said mobile communication device. Further the invention relates to a cellular network configured to communicate with a mobile communication device.

BACKGROUND OF THE INVENTION

In the field of wireless cellular communication it is known that each mobile communication device is operated with a subscriber identity module, in particular a SIM card or UICC. The subscriber identity module enables to authenticate towards the cellular network the one mobile communication device where it is connected with.

To assure that at one time only one mobile communication device in combination with the same subscriber identity module is authenticated towards the cellular network, it is known, that the mobile communication device needs to ensure that the subscriber identity module has not been removed during a communication session. This is done by sending with each paging a status command to the subscriber identity module. Should this presence detection fail, the mobile communication device has to terminate the communication session immediately. By this means it is assured that a subscriber identity module is not used by two active mobile communication devices on the cellular network.

In the field of wireless cellular communication a new category of devices is introduced in particular covered by new technology specification of long term evolution (LTE), which are the so-called machine-type communication (MTC) devices. Such MTC devices further comprise so-called low cost devices, which are supposed to operate in LTE networks only in a limited way, and hence less equipped with processors and other hardware resources than a full-featured LTE handset.

Those MTC devices are in particular characterized by the fact that they are operated with a battery with an expected lifetime without recharging which is far larger than that of mobile handsets. This is in particular achieved by considering that they are rarely contacted and practically operated stationary, hence a lot of operations used for regular communication measures with the cellular network resp. the base node where the mobile communication device is camping on—hereinafter called the serving base node—can be omitted or at least drastically reduced.

One of these operations is the DRX cycle which indicates the frequency for listening to paging messages from the serving base node. For such machine-type communication devices it is foreseen in particular a low power mode, where at least the DRX cycle is massively enlarged. In standardization document ETSI TS 26.304 Rel. 13.0.0 it is in particular suggested to allow DRX resp. extended DRX (eDRX) cycles with Paging Hyperframes (PH) leading to cycles of 3 to 24 hours. This is fully sufficient for a machine-type communication device, which e.g. once a day sends metering data to a remote server. Further the new Power Saving Mode (PSM) foresees to leave the mobile communication device asleep for a defined time period longer than e.g. a day, introduced in standardization document ETSI TS 24.301 Rel. 12.5.0.

However, with the increase of the DRX cycle it means at the same time that the frequency of detection of the presence of the subscriber identity module is increased to those values as well. This is in particular a problem, as for machine-type communication devices typically the SIMs/UICCs are accessible without removing the battery, unlike it is typically the case for mobile handsets.

In effect there is with recent developments of MTC devices the risk of a security leak in that sense, that more than one mobile communication device could without detection be registered in a cellular network with the same subscriber identity modules at the same time.

It is therefore the goal of present invention to provide a solution where this shortcoming of the recent developments is omitted and that the mobile communication device and the cellular network can react in case of removal of a subscriber identity module from the mobile communication device.

Further alternative and advantageous solutions would, accordingly, be desirable in the art.

SUMMARY OF THE INVENTION

For this it is according to a first aspect of the invention suggested a mobile communication device according to claim 1. It is further suggested according to a second aspect of the invention a method to operate a mobile communication device according to claim 7.

According to the first aspect of the invention it is proposed a mobile communication device for communicating with a cellular network by means of a serving base node, the mobile communication device further being connected to a subscriber identity module, the mobile communication device being configured to operate in a power optimization mode wherein the power optimization mode comprises extended paging periods, and the mobile communication device is further configured to set up a communication context with the base node using authentication means of the subscriber identity module, wherein the mobile communication device is further configured, in case of detection of a removal of the subscriber identity module and when the power optimization mode is activated:

to send an removal alert message to the serving base node by means of said communication context,
afterwards to terminate the communication context.

The invention relates to a mobile communication device operating in a cellular network for wireless communication. The mobile communication device is generally any kind of device comprising at least a communication unit and an antenna for accessing the wireless air interface to the serving base node. The serving base node is one of a plurality of base nodes belonging to the cellular network. It is the base node the mobile communication device is camping on.

The base node is the entry point of the cellular network to the air interface. Depending upon the supported technology, like 2G (GSM, GPRS, EDGE), 3G (UMTS, HSPA), 4G (LTE, LTE-Catx, LTE-M) the base node is implemented in particular as a base station (BS), nodeB, eNodeB.

The mobile communication device further comprises a subscriber identity module. This is a secure unit, which holds in its secured memory all necessary credentials for authenticating at the cellular network upon registration. The subscriber identity module is preferably provided by the network operator. It is put into the mobile communication device, which provides a SIM-card holder and with a connected subscriber identity module the mobile communication device is enabled to register at the cellular network. Typical embodiments of the subscriber identity module are a SIM-card or UICC which are typically removable, as well as an eUICC which is typically, but not necessarily soldered to the mobile communication device. Other embodiments are further thinkable, e.g. in conjunction with another secure card, like a banking card, which is removable and holds the credentials.

The mobile communication device is further configured to operate in a power optimization mode. This is in particular a mode which allows the mobile communication device to operate with the cellular network in a way which requires less signalling between the mobile communication device and the serving base node.

In particular stationary mobile communication devices, in particular machine-type communication (MTC) devices are configured to operate in such a power optimization mode. One of those power optimization modes is the standardized Power Saving Mode (PSM). Such Power Saving Mode is preferably designed to enhance the periods until a mobile communication device is expected to be paged. Such enhancement is more in the area of days rather than minutes. The concept is known as enhanced discontinuous reception (eDRX).

When a mobile communication device is registered at a base node it regularly carries out paging operations, which are mainly for checking if income messages or calls are present. In case of an active power saving mode such pagings are carried out only rarely, that is the paging period is massively expanded. By this the power consumption for the paging operation is omitted and such the battery lifetime is remarkably extended.

The mobile communication device is according to the invention configured to set up a communication context. Such communication context is in particular a Packet Data Protocol (PDP) context or an active Evolved Packet System (EPS) bearer context. Such context is envisaged to allow packet data exchange between mobile communication device and the cellular network, and allows to be resumed after a certain amount of time.

The setting up of the communication context is preferably carried out by an attach command. With that a data context session is established, and the mobile communication device gets in particular assigned an IP address.

Additionally the mobile communication device is further configured to check with each paging operation if the subscriber identity module is still connected to the mobile communication device.

Nonetheless the mobile communication device further comprises additional means to asynchronously detect if the subscriber identity module was removed.

It is in particular proposed to detect the removal of the subscriber identity module by means of at least one of
 a mechanical removal indicator pin, or
 a polling mechanism.

The removal indicator pin is a physical interrupt, known as CCIN, which indicates a physical removal from the SIM card holder of the mobile communication device.

With a polling mechanism it is possible to actively check for the availability of the subscriber identity module asynchronously to the paging cycle. Preferably this type of polling is carried out prior to each data transmission, when a communication context is established.

Once the mobile communication device detects the removal of the subscriber identity module, it is configured to send a removal alert message to the serving base node. This message is preferably sent by using the still existing communication context. It is the only allowed message transmission with a knowingly removed subscriber identity module.

It is further proposed that the removal alert message comprises at least an indication identifying the subscriber identity module or any identification of the certain mobile communication device.

With such a removal alert message the cellular network is informed about the removed subscriber identity module. This is advantageous as it can take appropriate measures in order to disallow a further registration of another mobile communication device by using the removed subscriber identity module. Without the removal alert message it would not be informed about this situation.

Preferably the removal alert message comprises identifying information unique for the subscriber identity module or the mobile communication device. In particular the IMEI resp. the IMSI would be appropriate for this purpose. In conjunction with further systems relating to network based device management also other identifiers are foreseen to be used.

Consequently the mobile communication device further terminates the communication context after the removal alert message is sent. This is preferably achieved by a context close command. This makes sure that no further communication is possible with the mobile communication device, as long as no eligible subscriber identity module is connected.

Further all authentication data resulting from the subscriber authentication at the cellular network are removed from the mobile communication device. Preferably also from the cellular network data relating to the authentication session of the subscriber identity module are removed. With that it is clear that the subscriber identity module together with this mobile communication device is not authenticated anymore. It hence requires a new registration at the cellular network if with a new or the same mobile communication device. It is up to the cellular network, if the subscriber identity module is even blocked or marked in response to reception of a removal alert message. Hence such fraud is successfully prevented on both ends of the air interface, and the opened security leak through the eDRX introduction is closed.

It is further in an advanced embodiment of the invention proposed to terminate the communication context as soon as an acknowledgement message from the serving base node is received.

This advantageous embodiment is dedicated to assure that the cellular network receives the removal alert message. Therefore the mobile communication device first expects an acknowledgement message indicating if the removal alert message was successfully received.

When the removal alert message was received, the mobile communication device knows that the cellular network is informed about the situation of the removed subscriber identity module. In response it can therefore close down the communication context, in particular the PDP context. By this any continued communication with the cellular network is prevented. So this advantageously assures that the removal alert message is the last message that was submitted by the mobile communication device with the existing communication context, but without connected subscriber identity module.

If the removal alert acknowledgment message was not received, then it is proposed in another preferred embodiment for the mobile communication device to resend the removal alert message to the serving base node in case the acknowledgement message is not received within a predetermined response time.

With this embodiment the mobile communication device takes care about that the cellular network gets reliably informed about the removal of the subscriber identity module. This applies in particular when the cellular network does not send a response at all, or a response indicating that the removal alert message was not successfully received. The latter is in particular the case when the removal alert message could not be decoded, or any sanity check might fail. Further when the indication identifying the subscriber identity module is inappropriate e.g. not known to the cellular network is preferably a reason to send a not-acknowledge message.

Depending upon the content of the response message the mobile communication device decides to make a retry by sending another removal alert message or to continue with the next operation, in particular ending of the communication context.

When the mobile communication device decides to do a retry, it is in particular proposed to carry out the resend operation with a higher signal strength than the previous send operation.

With this embodiment the mobile communication device is configured to overcome transmission issues from the first removal alert message transmission. This increases the likelihood that the cellular network receives the removal alert message.

Advantageously the mobile communication device further maintains a counter indicating the number of retries. So it is assured that after a predetermined amount of resending operations without an acknowledgement message the mobile communication device bails out to continue.

According to the second aspect of present invention it is suggested a method to operate a mobile communication device configured to communicate with a cellular network by means of a serving base node, further being connected to a subscriber identity module, and the mobile communication device being configured to operate in a power optimization mode wherein the power optimization mode comprises extended paging periods, and the mobile communication device is further configured to set up a communication context with the base node using authentication means of the subscriber identity module, the method comprising, in case of detection of a removal of the subscriber identity module and when the power optimization mode is activated, the steps of:

sending an removal alert message to the serving base node by means of said communication context, afterwards terminating the communication context.

The second aspect shares the advantages of the first aspect.

In a third aspect it is proposed a cellular network, comprising a plurality of base nodes, configured to communicate with at least one mobile communication device comprising a subscriber identity module, wherein the cellular network is further configured, upon reception of an removal alert message at a base node, to discard authentication data of the subscriber identity module, where the removal alert message is referring to.

This aspect of the invention relates to the cellular network. According to that the cellular network is prepared to receive a removal alert message from a mobile communication device, in particular a mobile communication device. according to the first aspect of the present invention.

When the cellular network, in particular via a base node of it, receives the removal alert message, it is preferably first decoded.

At what component of the cellular network this is carried out, depends upon the architecture of the cellular network, including the supported technology standard.

The base node or a respective unit responsible for the spatial region of the base node, e.g. the Mobility Management Entity (MME) would be a good place, as it is very likely that a subscriber identity module removed from one mobile communication device would be used in another mobile communication device situated in proximity of the first mobile communication device. Hence, the same tracking area or region is responsible for this.

After decoding the removal alert message the cellular network preferably checks the content of the message and if it is accurately understood. E.g. if the subscriber identity module ID comprised in the removal alert message is unknown, then it cannot be handled properly.

Preferably the removal alert message makes use of already existing messages and channels that are already in place for control signals between mobile communication device and the cellular network.

In another preferred embodiment of this aspect of the invention it is further proposed to send upon reception of the removal alert message an acknowledgment message to the mobile communication device indicating if the removal alert message was successfully received.

According to this embodiment the outcome of the checks for the received removal alert message at the cellular network is preferably reported back to the sending mobile communication device by way of a response message. If the response is positive, the response message resp. the acknowledgment message indicates that the reception of the removal alert message was successful.

If not, preferably the cellular network sends another response message resp. not-acknowledgment message indicating that the reception of the initial message was not successful. In particular when the removal alert message was not understandable by the cellular network as that type of message preferably any type of response indicating this fact is advantageous.

Preferably the mobile communication device is configured to react properly, so that it either continues its process or tries again to send the removal alert message.

In any case, when the removal alert message is successfully received at the cellular network, then the transmitted information are taken into account in order to prevent fraudulent registration with the removed subscriber identity module.

Preferably the communication context of the first mobile communication device is terminated, in particular right after sending a response message.

Any data related to the communication context, in particular authentication data are deleted, in the base node and/or the MME.

Preferably the cellular network may decide that any authentication data relating to the subscriber identity module get marked as blocked or at least marked as potentially illegally used. This is in particular applicable as long as the original mobile communication device together with the original subscriber identity module tries to register in the cellular network. Alternatively it is preferable that the subscriber identity module together with another mobile communication device is not able to register in the cellular network.

Such registration would in that case be prevented. This option would in particular lead to a temporary blocking.

So this aspect of the invention advantageously closes the last gap, so that both on mobile communication device and on cellular network side everything is done, to attack said security leak.

As it is shown this invention advantageously solves the problem with the depicted security leak and provides a reliable approach to avoid without impacting of the normal operation the use of a subscriber identity module with a second mobile communication device, while a first mobile communication device is still in a communication context.

BRIEF DESCRIPTION OF THE DRAWINGS

The following description and the annexed drawings set forth in detail certain illustrative aspects and are indicative of but a few of the various ways in which the principles of the embodiments may be employed. Characteristics and advantages of the present invention will appear when reading the following description and annexed drawings of advantageous embodiments given as illustrative but not restrictive examples.

FIG. 1 schematically shows a mobile communication device 1 of the type to which the present invention is applied as an embodiment. It is equipped with all components required for communicating with a base node 3 of a cellular network 2.

Figure 1:
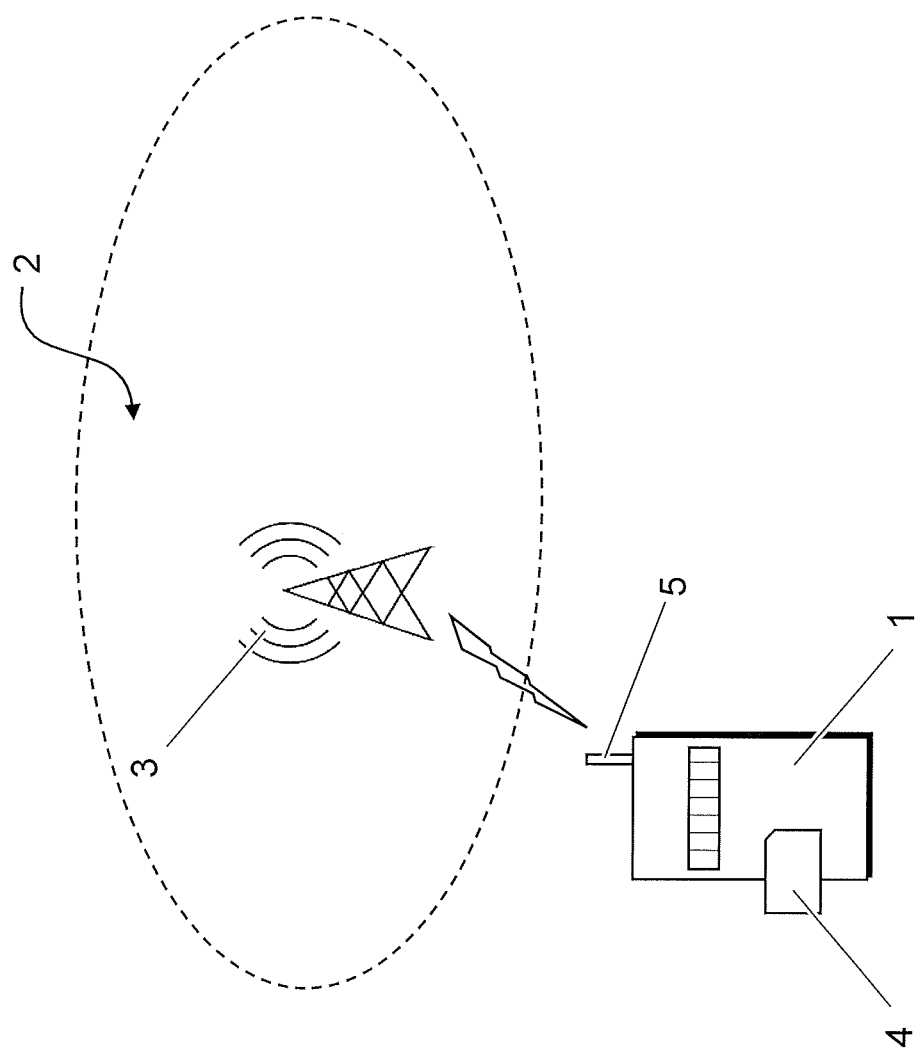
FIG. 1 represents a mobile communication device of the type to which the present invention is applied to as an embodiment in conjunction with a cellular network.

Such components are in particular an antenna 5 and a subscriber identity module 4, in particular a SIM card or an UICC. This subscriber identity module 4 is in particular removable from the mobile communication device 1. The mobile communication device 1 is in the shown embodiment a machine-type communication device, in particular a metering device. This is typically installed that way that is not movable, resp. operated stationary.

Such machine-type communication (MTC) devices 1 have the peculiarity that they only rarely send measured data, like electricity consumption, to a remote central server. They are practically never called from outside, and if so, they do not have means to take the call. Hence, there is for such a mobile communication device neither a need to check for neighbour cells regularly nor for paging in order to determine an incoming call.

On the other hand such a machine-type communication devices is preferably operated with a battery. Hence the power consumption is of essence for the maintenance-free lifetime of the mobile communication device.

For such scenarios concepts like Power Saving Mode (PSM) are foreseen. According to those concepts, at least the DRX cycle is extremely enhanced, consequently leading to the eDRX with a duration of many hours or even days. It takes both the base node 3 resp. cellular network 2 and the mobile communication device to support this mode. In the following it is assumed, that both serving base node 3 and the mobile communication device 1 in question support PSM or a similar power optimization mode, comprising enhanced paging cycles.

As it can be seen, for such mobile communication devices the subscriber identity module 4 is not necessarily located below the battery, as it is the case for most of the mobile handsets. That implies that during a set up communication context of a mobile communication device, the subscriber identity module 4 may be removable without powering down the mobile communication device.

For that purpose the invention is foreseen.

Figure 2:
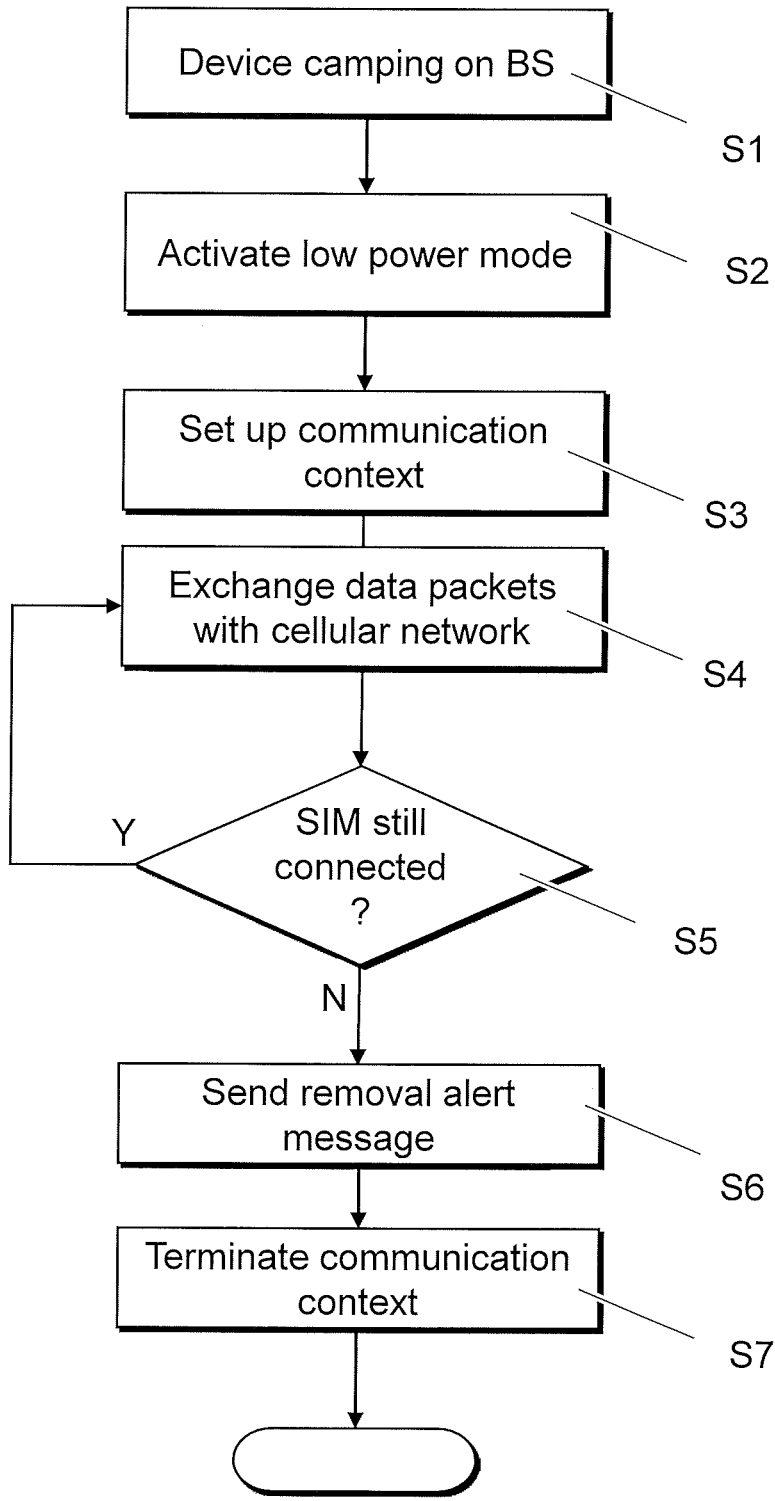
FIG. 2 shows a flow chart indicating a process flow according to a preferred embodiment of the invention.

FIG. 2 shows a flow chart of an advantageous first embodiment of the inventive method. It starts in step S1 with a mobile communication device 1 camping on a base node 3. Preferably it is a base node supporting a power optimization mode. Preferably the mobile communication device registered before on this base node. As part of this, it authenticated at the cellular network 2 with the credentials stored in the subscriber identity module 4.

After a while the mobile communication device automatically or driven from outside—either through manual input or cellular network signalling—activates the power optimization mode (step S2). This mode comprises at least an increase of paging cycles resp. eDRX. Other power intensive operations might be switched off or reduced in parallel, like mobility functions etc.

In step S3 then the mobile communication device establishes with the cellular network a communication context. This happens in particular by an attach command to the cellular network, and/or a context activation. With doing that the mobile communication device is in the situation to exchange data with the cellular network. It has an IP address assigned and can send and receive data packets to/from the cellular network. Typically it is called a data session setup.

This step is not mandatorily carried out after switching to the low power mode. On the other hand it is advantageous to do so, as for the established communication context the signalling conditions do not change afterwards. In the following the mobile communication device might send or receive data to/from the cellular network by means of the communication context, as indicated by step S4.

In step S5 it is then checked if the SIM (resp. UICC) is still connected with the mobile communication device. This is happening in particular by an interrupt, like CCIN or by polling. The polling is running asynchronous to the paging procedure, different from the non-PSM standard compliant mobile communication devices. Preferably the availability of the subscriber identity module is polled prior to each data transmission.

Should the SIM still be connected, the operation continues with step S4. A waiting period or other operations may happen in the meantime.

Otherwise a situation is detected where the mobile communication device is not in the position to use the cellular network anymore, as the subscriber identity module has been removed.

Hence the process flow branches to step S6. During this step a removal alert message is sent to the cellular network, resp. the base node. This is done in order to inform the cellular network about a potential fraud action.

Preferably the cellular network takes appropriate steps as indicated with the third aspect of the invention. For that the removal alert message in particular comprises an indication for identifying the removed SIM card, in particular IMSI or MS-ISDN.

It is a unique situation that a mobile communication device knowingly without a connected subscriber identity module sends data signals to the cellular network. This is only possible by means of the already setup communication context. This is the proof that the mobile communication device was just recent eligible to access the cellular network. Hence it is not necessarily important if the removal alert message is sent by means of the communication context, but at least while the communication context is still active.

After successfully sending of the removal alert message, the mobile communication device directly terminates in step S7 the communication context. With that it is assured that this mobile communication device will not send any other data in the current status of an active communication context but without connected subscriber identity module.

Figure 3:
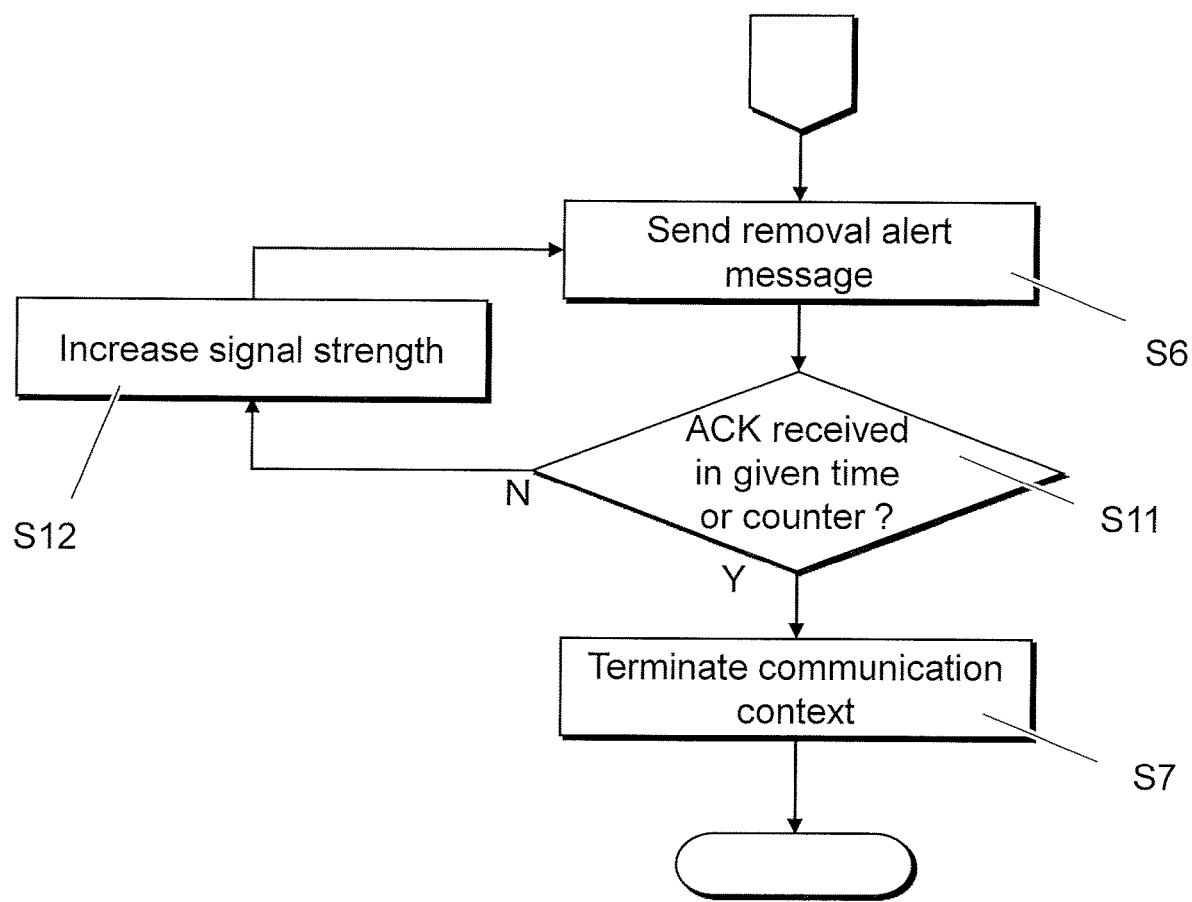
FIG. 3 represents a flow chart indicating a process flow according to another preferred embodiment of the invention.

FIG. 3 shows a variant of the previously shown flow chart, here with a more detailed view at the end of the process. The common operation steps with previous FIG. 2 have the same reference number. So the process is started with steps S6, which follows the detection of the removed subscriber identity module in FIG. 2.

After the removal alert message is sent, the mobile communication device checks in step S11 for a response from the serving base node. There are different possibilities to respond. One is no response at all, another one is an acknowledgment response message, and further there is a non-acknowledgement response message.

For receiving an acknowledgement response message (ACK) it is foreseen a preconfigured time for a response. If no response arrives in this timer, then the process flow branches along the no-path to step S12.

If a message is received from the cellular network, it is analysed if it comprises an acknowledgement or a non-acknowledgement. In case of an acknowledgment, the process flow branches to step S7.

Otherwise the process flow branches to step S12. Here it is suggested to increase signal strength. This is in particular advantageous when no response was received. But also a non-acknowledgment response message might be an indicator for bad signalling reception at the base node. When this branch is taken, preferably a counter is incremented. With this counter it is measured how often it was tried to resend the removal alert message in step S6.

Hence, when the process flow returns to step S11 for decision if the removal alert message was understood0 well, also the counter is taken into account. If the counter is higher than a predetermined threshold—something in the medium one-digit range was found reasonable—then the process flow branches to step S7, no matter if an acknowledgment was received in time and/or what content it provided.

In step S7 then the mobile communication device terminated the communication context and stops working until an activated and not blocked subscriber identity module is connected again.

Figure 4:
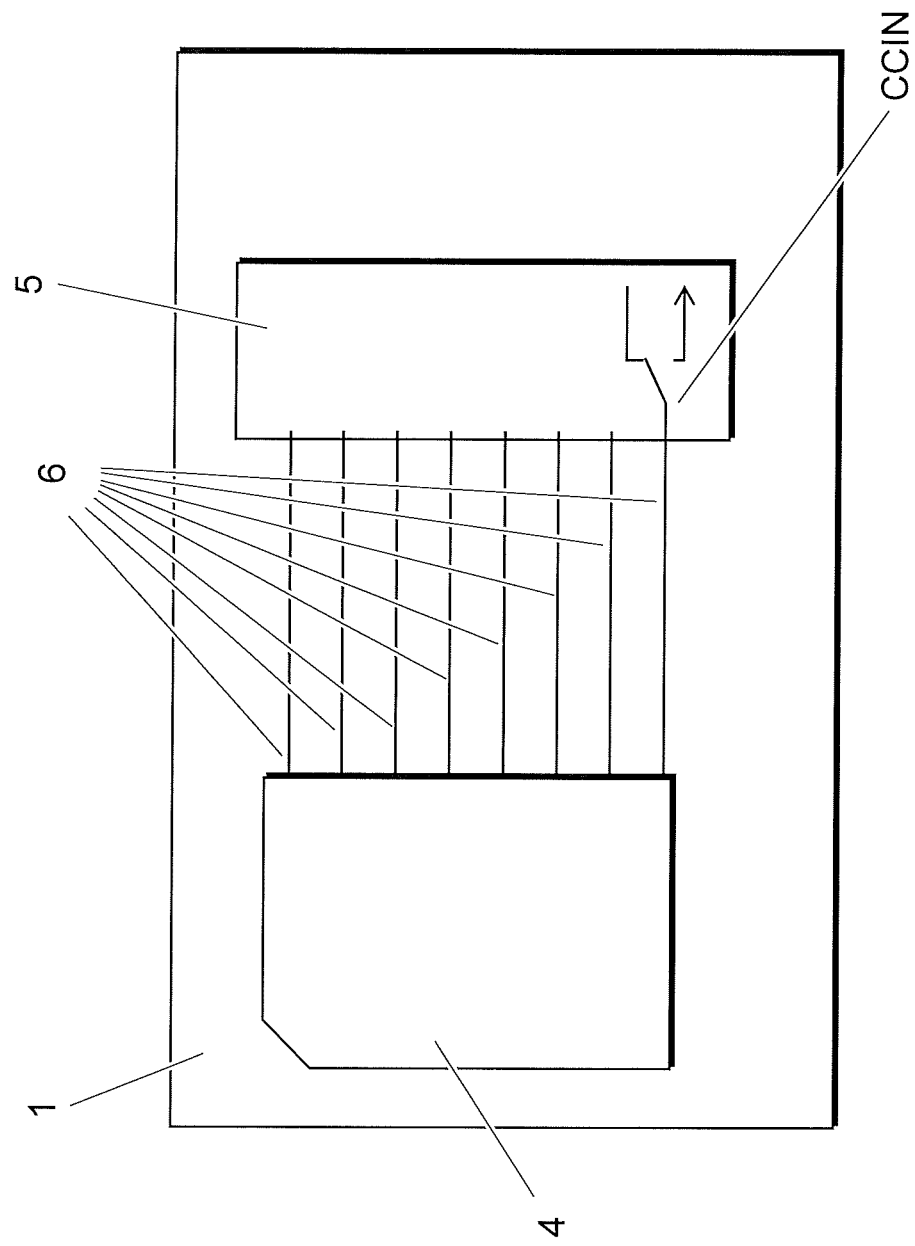
FIG. 4 shows a subscriber identity module connected with a mobile communication device according to an embodiment of the invention.

FIG. 4 shows schematically the connection of a subscriber identity module 4 with a mobile communication module 1. It typically is connected by a SIM card holder 5. This SIM card holder comprises a limited number of connectors 6 for accessing the pins of the subscriber identity module 4. Each pin/connector has its special task. One pin is assigned to the interrupt connector CCIN. This is a hardware interrupt. When the subscriber identity module 4 is removed, then the CCIN is opened and an interrupt is triggered. This interrupt is detected within the mobile communication device 1 and triggers the process flow according to the invention, as shown in the following FIG. 5.

Figure 5:
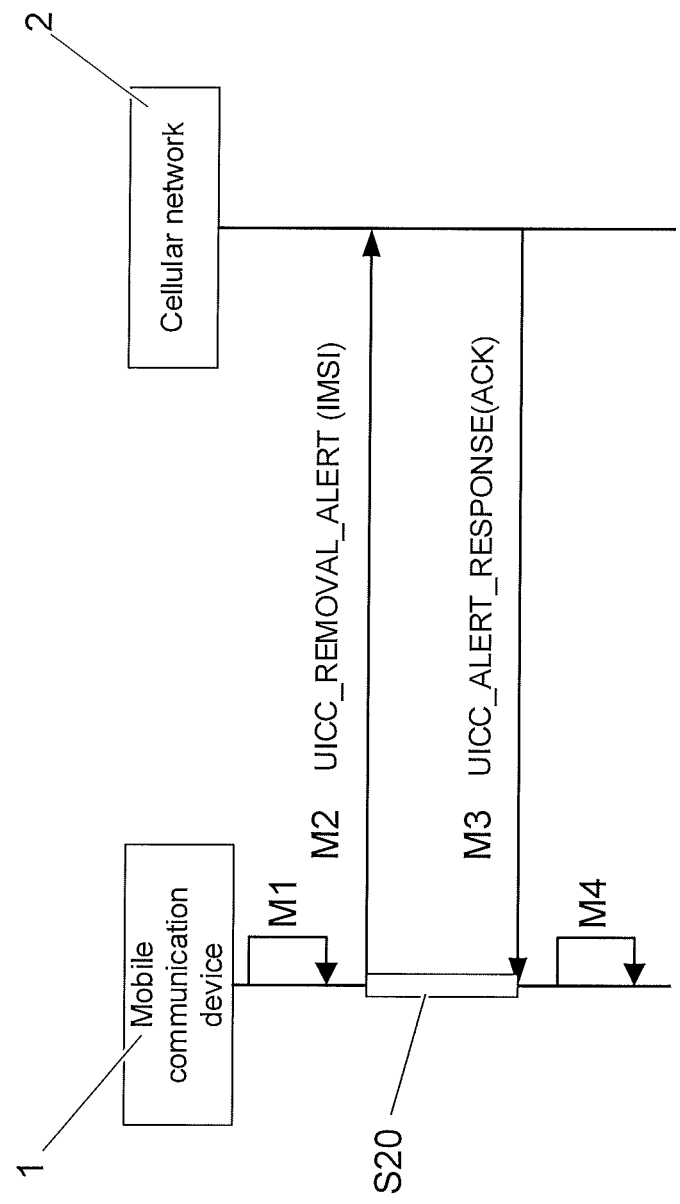
FIG. 5 represents a sequence diagram indicating the messaging between a mobile communication device and a cellular network according to embodiments of the current invention.

FIG. 5 shows for a preferred embodiment of the invention a message flow between the mobile communication device 1 and the cellular network 2, in particular represented by a base node 3. In message M1 the mobile communication device detects the removal of the subscriber identity module, in particular by the interrupt pin CCIN.

In response, the mobile communication device sends a message M2 to the cellular network 2, resp. the base node 3. This message M2 is called UICC_REMOVAL_ALERT, indicating the removal of the subscriber identity module.

In this case the UICC_REMOVAL_ALERT message further comprises the IMSI for indicating the removed subscriber identity module.

In the following the mobile communication device has activated step S20 for waiting for a response from the cellular network. Should no response come in a given time range, then the mobile communication device continues working. Alternatively another UICC_REMOVAL_ALERT is sent by the mobile communication device, preferably with higher signal strength.

In the shown case, the cellular network sends a response message M3, called UICC_ALERT_RESPONSE. This is to confirm reception of the UICC_REMOVAL_ALERT message, resp. any alert message. In this embodiment the response message further provides an indicator ACK if the UICC_REMOVAL_ALERT message is acknowledged, which means it is understood and processed. In the simplest form, the ACK parameter is a simple binary argument indicating if the removal alert message M2 was well received or not.

If the indicator is ACK=true, then the mobile communication device continues with message M4, which comprises the termination of the communication context.

After finishing this process flow, all the relevant steps for facing the unauthorized removal of the subscriber identity module.

On the side of the cellular network preferably additional steps are taken to end the registration resp. context of the mobile communication device 1 in conjunction with the removed subscriber identity module 4.

In the above detailed description, reference is made to the accompanying drawings that show, by way of illustration, specific embodiments in which the invention may be practiced. These embodiments are described in sufficient detail to enable those skilled in the art to practice the invention. It is to be understood that the various embodiments of the invention, although different, are not necessarily mutually exclusive. For example, a particular feature, structure, or characteristic described herein in connection with one embodiment may be implemented within other embodiments without departing from the scope of the invention. In addition, it is to be understood that the location or arrangement of individual elements within each disclosed embodiment may be modified without departing from the scope of the invention. The above detailed description is, therefore, not to be taken in a limiting sense, and the scope of the present invention is defined only by the appended claims, appropriately interpreted, along with the full range of equivalents to which the claims are entitled.

The invention claimed is:

1. A mobile communication device for communicating with a cellular network by means of a serving base node, the mobile communication device further being connected to a subscriber identity module having authentication credentials, the mobile communication device being configured to operate in a power optimization mode wherein the power optimization mode comprises extended paging periods, and the mobile communication device is further configured
to set up a communication context with the base node using the authentication credentials of the subscriber identity module,
wherein the mobile communication device is further configured, in response to detection of a removal of the subscriber identity module while operating in the power optimization mode:
to send a removal alert message to the serving base node by means of said communication context, and
to terminate the communication context subsequently to the sending of the removal alert message.

2. The mobile communication device according to claim 1,
wherein the removal alert message comprises at least an indication identifying the subscriber identity module or any identification of the mobile communication device.

3. The mobile communication device according to claim 1,
further configured to terminate the communication context as soon as an acknowledgement message from the serving base node is received.

4. The mobile communication device according to claim 3,
further configured to resend the removal alert message to the serving base node in response to not receiving the acknowledgement message within a predetermined response time.

5. The mobile communication device according to claim 4,
further configured to carry out the resend operation with a higher signal strength than the previous send operation.

6. The mobile communication device according to claim 1,
further configured to detect the removal of the subscriber identity module by means of at least one of
a mechanical removal indicator pin, or
a polling mechanism.

7. A method to operate a mobile communication device configured to communicate with a cellular network by means of a serving base node, further being connected to a subscriber identity module having authentication credentials, and the mobile communication device being configured to operate in a power optimization mode wherein the power optimization mode comprises extended paging periods and the mobile communication device being configured to set up a communication context with the base node using the authentication credentials of the subscriber identity module,
the method comprising, in response to detection of a removal of the subscriber identity module while operating in the power optimization mode, the steps of:
sending a removal alert message to the serving base node by means of said communication context,
terminating the communication context subsequently to the sending of the removal alert message.

8. The method according to claim 7,
wherein the removal alert message comprises at least an indication identifying the subscriber identity module.

9. The method according to claim 7,
wherein the step of terminating of the communication context is carried out upon reception of an acknowledgement message from the serving base node.

10. The method according to claim 9,
further comprising the step of resending the removal alert message to the serving base node in response to not receiving the acknowledgement message within a predetermined response time.

11. The method according to claim 7,
wherein the detection of the removal of the subscriber identity module is carried out by means of at least one of:
a mechanical removal indicator pin, or
a polling mechanism.

* * * * *